US012558760B2

(12) United States Patent
Cho et al.

(10) Patent No.: US 12,558,760 B2
(45) Date of Patent: Feb. 24, 2026

(54) FAUCET WRENCH

(71) Applicant: Milwaukee Electric Tool Corporation, Brookfield, WI (US)

(72) Inventors: Lucy Seokyung Cho, Rolling Meadows, IL (US); Benjamin T. Jones, St. Francis, WI (US); Jedidiah J. Babinec, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 402 days.

(21) Appl. No.: 18/160,030

(22) Filed: Jan. 26, 2023

(65) Prior Publication Data

US 2023/0226669 A1 Jul. 20, 2023

Related U.S. Application Data

(63) Continuation of application No. PCT/US2023/060655, filed on Jan. 13, 2023.

(Continued)

(51) Int. Cl.
*B25B 13/58* (2006.01)
*B25B 13/50* (2006.01)

(Continued)

(52) U.S. Cl.
CPC .............. *B25B 13/58* (2013.01); *B25B 13/50* (2013.01); *B25B 23/0035* (2013.01); *B25B 13/481* (2013.01)

(58) Field of Classification Search
CPC ....... B25B 13/04; B25B 13/06; B25B 13/065; B25B 13/107; B25B 13/48; B25B 13/481;

(Continued)

(56) References Cited

U.S. PATENT DOCUMENTS 4,882,958 A * 11/1989 McNeeley .............. B25B 13/56 81/439
5,542,321 A 8/1996 Fuca (Continued)

FOREIGN PATENT DOCUMENTS

CN 204108907 1/2015
CN 104476492 4/2015

(Continued)

OTHER PUBLICATIONS

International Search Report and Written Opinion and International Application No. PCT/US2023/060655, dated May 9, 2023, 10 pages.

*Primary Examiner* — Robert J Scruggs
(74) *Attorney, Agent, or Firm* — Reinhart Boerner Van Deuren s.c.

(57) ABSTRACT

Various embodiments of a faucet wrench are provided. The faucet wrench includes a first insert that includes multiple inner jaw surfaces. The multiple inner jaw surfaces are each configured to engage workpieces of different sizes. In specific embodiments, the first insert includes a plurality of stackable components, each with multiple inner jaw surfaces. The plurality of stackable components can be interchanged and/or reoriented by a user to allow the user to select a preferred inner jaw surface to be used for a given task. In further specific embodiments, the first insert includes a pivotable wedge that allows the faucet wrench to be used in different orientations. In specific embodiments, the faucet wrench also has a second insert that includes multiple work surfaces for engaging an additional variety of workpieces.

16 Claims, 16 Drawing Sheets

Related U.S. Application Data

(60) Provisional application No. 63/327,613, filed on Apr. 5, 2022, provisional application No. 63/312,296, filed on Feb. 21, 2022, provisional application No. 63/299,998, filed on Jan. 16, 2022.

(51) Int. Cl.
*B25B 23/00* (2006.01)
*B25B 13/48* (2006.01)

(58) Field of Classification Search
CPC ..... B25B 13/50; B25B 13/5091; B25B 13/58; B25B 23/0035; E03C 1/02
See application file for complete search history.

(56) References Cited

U.S. PATENT DOCUMENTS

| | | | | |
|---|---|---|---|---|
| 5,996,447 | A | 12/1999 | Bayouth | |
| 6,257,099 | B1 | 7/2001 | Rosenbaum | |
| 6,276,237 | B1 | 8/2001 | Stacy | |
| 6,463,833 | B1 | 10/2002 | Lund | |
| 6,474,201 | B1 | 11/2002 | Lund | |
| 6,626,071 | B2 | 9/2003 | Kesinger et al. | |
| 6,698,317 | B1 | 3/2004 | Machovsky | |
| D560,986 | S * | 2/2008 | Adkins | D8/29 |
| 7,334,506 | B2 | 2/2008 | Hui | |
| 7,343,836 | B1 | 3/2008 | Ward | |
| D892,592 | S * | 8/2020 | Patil | B25B 23/0035 D8/107 |
| 10,836,026 | B2 | 11/2020 | Moufawad | |
| 10,946,501 | B2 | 3/2021 | Patil et al. | |
| 2004/0035260 | A1 | 2/2004 | Adkison | |
| 2004/0255727 | A1 | 12/2004 | Kovach | |
| 2005/0098001 | A1 | 5/2005 | Walker | |
| 2005/0199103 | A1 | 9/2005 | Thompson et al. | |
| 2006/0243102 | A1 | 11/2006 | Vines | |
| 2008/0034927 | A1 | 2/2008 | Adkins et al. | |
| 2008/0066584 | A1 | 3/2008 | Vines | |
| 2017/0028535 | A1 | 2/2017 | Frandina | |
| 2017/0157749 | A1 | 6/2017 | Levy | |
| 2017/0232587 | A1 | 8/2017 | Tommaso | |
| 2021/0220973 | A1* | 7/2021 | Patil | B25F 1/04 |

FOREIGN PATENT DOCUMENTS

| | | |
|---|---|---|
| CN | 211332946 | 8/2020 |
| CN | 212218312 | 12/2020 |
| CN | 212497466 | 2/2021 |

* cited by examiner

FAUCET WRENCH

CROSS-REFERENCE TO RELATED PATENT APPLICATIONS

This application is a continuation of International Application No. PCT/US2023/060655, filed Jan. 13, 2023, which claims the benefit of and priority to U.S. Provisional Application No. 63/327,613, filed Apr. 5, 2022, to U.S. Provisional Application No. 63/312,296, filed Feb. 21, 2022, and to U.S. Provisional Application No. 63/299,998, filed Jan. 16, 2022, which are incorporated herein by reference in their entireties.

BACKGROUND OF THE INVENTION

The present disclosure is directed generally to the field of tools. The present disclosure relates specifically to a faucet wrench.

SUMMARY OF THE INVENTION

One embodiment of the invention relates to a faucet wrench. The faucet wrench includes an elongate body with a first end, a second end opposing the first end, and a slot extending between the first end and the second end along a longitudinal axis. The faucet wrench further includes a first insert that is removably couplable to the elongate body and positioned at the first end of the body. The first insert includes a first component and a second component. The first component includes a first inner jaw surface that provides a first wrench size and a second inner jaw surface that provides a second wrench size. The second component is stacked relative to the first component along the longitudinal axis. The second component includes a third inner jaw surface that provides a third wrench size and a fourth inner jaw surface that provides a fourth wrench size.

Another embodiment of the invention relates to a faucet wrench. The faucet wrench includes a body with a first end, a second end opposing the first end, and a middle portion positioned between the first end and the second end. The body further includes bridging coupled to an interior surface of the middle portion and a passageway extending between the first end and the second end defining a longitudinal axis. The faucet wrench further includes a first insert couplable to the first end of the body. The first insert includes a first component and a second component. The first component includes a first inner jaw surface with a first dimension to engage a workpiece having a first size and a second inner jaw surface with a second dimension to engage a workpiece having a second size. The second component is spaced relative to the first component along the longitudinal axis. The second component includes a third inner jaw surface with a third dimension to engage a workpiece having a third size and a fourth inner jaw surface with a fourth dimension to engage a workpiece having a fourth size. The bridging includes a height such that the middle portion of the body receives a portion of a supply line when the faucet wrench is in use.

Another embodiment of the invention relates to a faucet wrench. The faucet wrench includes an elongate body with a first end, a second end opposing the first end, and a slot extending between the first end and the second end along a longitudinal axis. The faucet wrench further includes a first insert that is removably couplable along an interior surface of the elongate body and positioned at the first end of the elongate body. The first insert includes a first component and a second component. The first component includes a first inner jaw surface that provides a first wrench size and a second inner jaw surface that provides a second wrench size. The second component is stacked relative to the first component along the longitudinal axis. The second component includes a third inner jaw surface that provides a third wrench size and a fourth inner jaw surface that provides a fourth wrench size. A channel is defined in the interior surface of the elongate body and extends in a generally parallel direction to the longitudinal axis. When the first insert is coupled to the elongate body, a portion of the first insert is received within the channel to secure the insert to the elongate body.

Various embodiments of the invention relate to a tool, such as a faucet wrench, including a variety of features designed to engage various components, parts, workpieces, etc. that are typically needed during faucet work, such as faucet installation.

According to a first embodiment, the faucet wrench includes an elongate body having a first longitudinal end and a second longitudinal end opposite the first longitudinal end. At the first longitudinal end of the body, a first insert is coupled to and positioned at least in part within the body. The first insert is generally cylindrical and includes a first component and a second component. The first component and the second component are stacked with respect to one another along a length of the body. The first component includes a first inner jaw surface that provides a first wrench size and a second inner jaw surface that provides a second wrench size. The second component includes a third inner jaw surface that provides a third wrench size and a fourth inner jaw surface that provides a fourth wrench size. The first component is interchangeable with the second component.

According to another embodiment, the faucet wrench includes an elongate body having a first longitudinal end and a second longitudinal end opposite the first longitudinal end. A first insert is coupled to the body at the first longitudinal end of the body. The first insert includes a wedge that pivots between a first position and a second position. The wedge pivots ninety degrees between the first position and the second position. The wedge includes a plurality of stepped inner jaw surfaces, specifically, a first inner jaw surface and second inner jaw surface. The first inner jaw surface provides a first wrench size and the second inner jaw surface provides a second wrench size.

In specific embodiments, positioning the wedge in the first position allows the faucet wrench to operate in a vertical orientation to actuate the engaged workpiece, and positioning the wedge in the second position allows the faucet wrench to operate in a horizontal orientation to actuate the engaged workpiece.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Figure 1:
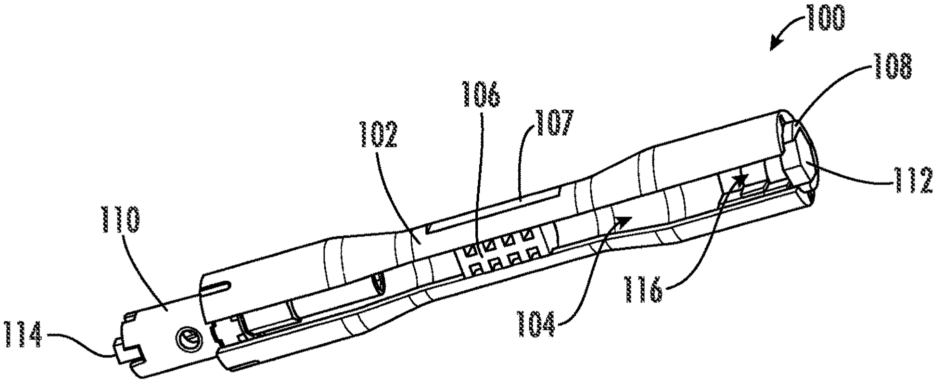
FIG. 1 is a perspective view from the front of a faucet wrench, according to an exemplary embodiment.

Referring generally to the figures, various embodiments of a faucet wrench or basin wrench are provided. In specific embodiments, the faucet wrench provides for a variety of features, engagement surfaces, and/or inserts to facilitate use and engagement with common workpieces as needed during faucet work, such as faucet installation. In various embodiments, the faucet wrench includes a body with an outer surface design to improve gripping.

In specific embodiments, the faucet wrench includes a first insert that can be reoriented such that the same insert can engage workpieces having a variety of different shapes and sizes. In certain specific embodiments, the first insert includes a plurality of inner jaw surfaces that are sized to engage and actuate workpieces of different sizes. In more specific embodiments, the first insert includes multiple stackable components that can be interchanged and/or reoriented by a user to allow the user to select from a variety of different inner jaw surfaces. In other specific embodiments, one or more inner jaw surfaces are formed on a pivotable wedge. The pivoting function of the wedge allows the faucet wrench to be utilized in multiple orientations, such as vertically when the wedge is pivoted inward and horizontally when the wedge is pivoted outward. The vertical orientation allows the faucet wrench to operate in narrow spaces, while the horizontal orientation allows for higher applications of torque to the workpiece engaged by the faucet wrench.

In various embodiments of the faucet wrench handle and inserts discussed herein, provide for a variety of characteristics, including compactness (i.e., tool diameter, length, wall thickness, etc.), multiple functions (i.e., interchangeability, engagement with various workpiece sizes and/or shapes), and strength (i.e., ability to withstand force and/or torque during use). Various aspects of the faucet wrench and handle design are selected to ensure operation of the faucet wrench creates a satisfactory amount of force, torque, and/or workpiece engagement. In such faucet wrenches, the force, torque, and/or workpiece engagement are a function of a variety of parameters that relate to the force provided such as tool length, tool diameter, wall thickness of the handle, material of handle, material of insert, etc.

In various specific embodiments, the handle of the faucet wrench is configured to receive a portion of a supply line when faucet wrench is in use. As will be generally understood, interior bridging of the handle provides additional structural support to the handle and when the interior bridging is oriented vertically (i.e., along longitudinal axis of the tool) a greater portion of a slot or passageway through the handle can be utilized for receiving a portion of the supply line, whereas orienting the bridging horizontally (i.e., perpendicular to longitudinal axis) provides increased structural support in the lateral direction and provides a platform to support and store nuts removed while working on a given project. In various specific embodiments, interior bridging of the handle includes a vertical portion extending along the longitudinal axis and a horizontal portion extending in a generally perpendicular orientation to the vertical portion. In such specific embodiments, the bridging includes a dimension or height such that middle portion of the handle receives a portion of a supply line when the faucet wrench is in use. Applicant believes the bridging discussed herein allows for the handle to receive a portion of the supply line, while maintaining the compactness, strength and/or manufacturability of the faucet wrench handle.

Figure 2:
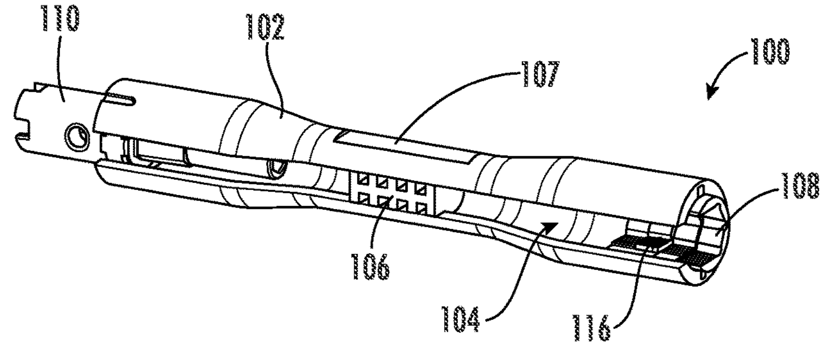
FIG. 2 is another perspective view from the front of the faucet wrench shown in FIG. 1, according to an exemplary embodiment.
Figure 3:
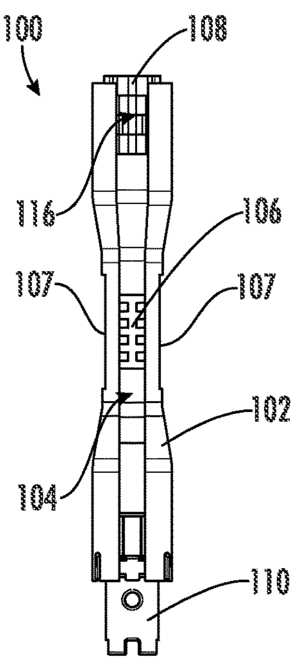
FIG. 3 is a front view of the faucet wrench shown in FIG. 1, according to an exemplary embodiment.
Figure 4:
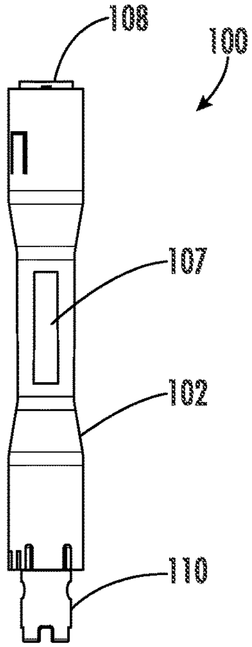
FIG. 4 is a side view of the faucet wrench shown in FIG. 1, according to an exemplary embodiment.

FIGS. 1-4 show a faucet wrench 100 that includes a body 102. Body 102 is elongate and defines a slot 104 along its length. As shown in FIGS. 1-3, slot 104 extends the full length of body 102. In specific embodiments, slot 104 is configured to receive a portion of a supply line when faucet wrench 100 is in use. In specific embodiments, body 102 is 12" in length and has a maximum diameter of 1.85" or 47 mm and a tool bulk diameter of 1.92" or 49 mm. Additionally, as shown in FIGS. 1-3, interior bridging 106 is coupled to a mid-section of the body 102. Bridging 106 provides additional structural support to the body 102. Further, the exterior of body 102 includes a pair of opposing, generally flat or planar surfaces 107 configured to be engaged by a standard wrench should additional torque be required to rotate a workpiece engaged by faucet wrench 100.

Faucet wrench 100 further includes a first insert 108 and a second insert 110 positioned at opposing longitudinal ends of body 102. First insert 108 is configured to engage workpieces of various shapes and sizes, such as hex nut 112, shown in FIG. 1. Second insert 110 is likewise configured to engage workpieces of various shapes and sizes, such as bolt 114, shown in FIG. 1. First insert 108 is generally cylindrical and includes various features to facilitate insert retention, as will be described in greater detail below. The generally cylindrical shape of first insert 108 allows body 102 to likewise maintain a generally cylindrical shape, which slims the profile of body 102 and allows body 102 to axially rotate more efficiently in narrow or tight spaces. Similar to body 102, first insert 108 defines a slot 116 configured to receive a portion of a supply line when faucet wrench 100 is in use. As shown in FIGS. 1-3, slot 104 of body 102 substantially aligns with slot 116 of first insert 108.

Figure 5:
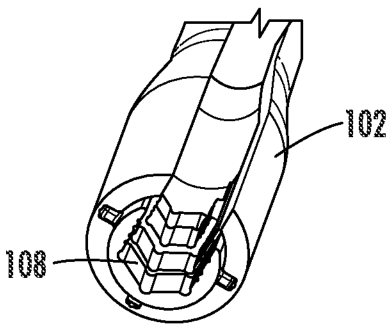
FIG. 5 is a perspective view from the front of the first end of the faucet wrench shown in FIG. 1, according to an exemplary embodiment.
Figure 6:
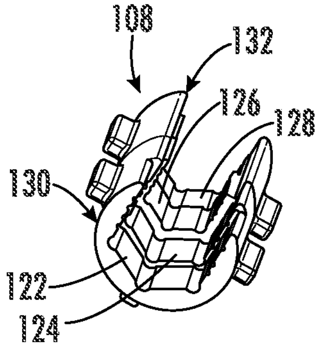
FIG. 6 is a perspective view from the front of the first insert of the faucet wrench shown in FIG. 5, according to an exemplary embodiment.
Figure 7:
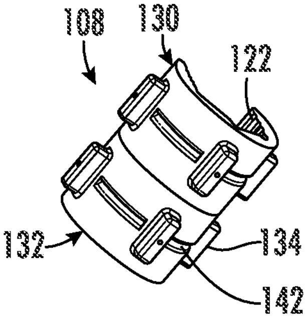
FIG. 7 is a perspective view from the rear of the first insert shown in FIG. 6, according to an exemplary embodiment.
Figure 8:
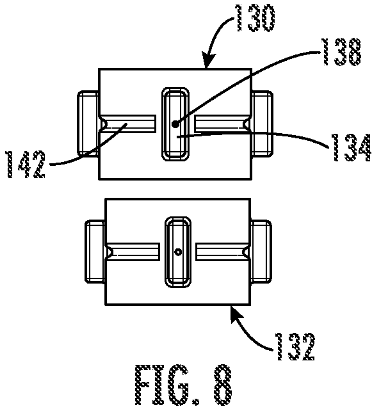
FIG. 8 is a rear view of two stackable components that comprise the first insert shown in FIG. 6, according to an exemplary embodiment.
Figure 9:
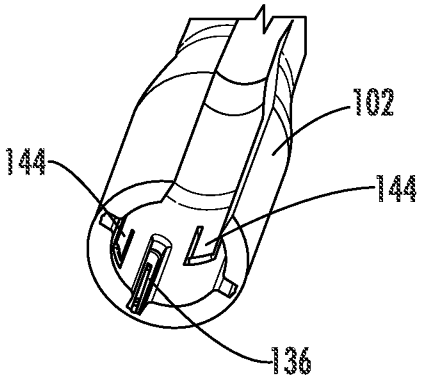
FIG. 9 is a perspective view from the front of the first end of the faucet wrench shown in FIG. 1 with the first insert removed, according to an exemplary embodiment.
Figure 10:
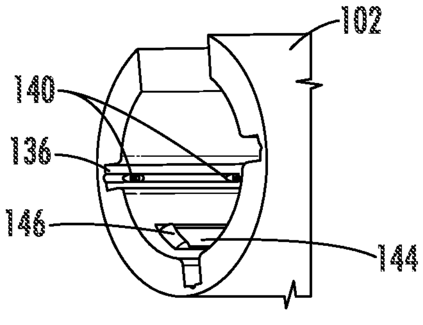
FIG. 10 is an enlarged perspective view from the side of the first end of the faucet wrench shown in FIG. 1 with the first insert removed, according to an exemplary embodiment.

Referring to FIG. 5, the first end of faucet wrench 100 is shown. As shown in FIG. 5, first insert 108 is coupled to body 102 and at least in part positioned within body 102. FIGS. 6-8 show the first insert 108, and FIGS. 9-10 show the first end of body 102 that receives first insert 108, with first insert 108 removed.

In specific embodiments, first insert 108 includes multiple stepped inner jaw surfaces, each for engaging a wide variety of differently sized workpieces, specifically differently sized nuts. As shown in FIGS. 5-7, first insert 108 includes a first inner jaw surface 122 that provides a first wrench size, a second inner jaw surface 124 that provides a second wrench size, a third inner jaw surface 126 that provides a third wrench size, and a fourth inner jaw surface 128 that provides a fourth wrench size. As shown in FIGS. 5-7, the first wrench size is 5⁄16," the second wrench size is 13⁄16," the third wrench size is 5⁄8," and the fourth wrench size is 3⁄4." In specific embodiments, each of the first component 130 and second component 132 include exterior indicators that indicate the size of the corresponding surface.

As shown in FIGS. 5-8, first insert 108 includes two interchangeable components, shown as first component 130 and second component 132. In specific embodiments, first component 130 and second component 132 each include dual inner jaw surfaces. As shown in FIGS. 5-8, first component 130 includes first inner jaw surface 122 and second inner jaw surface 124, and second component 132 includes third inner jaw surface 126 and fourth inner jaw surface 128.

Figure 11:
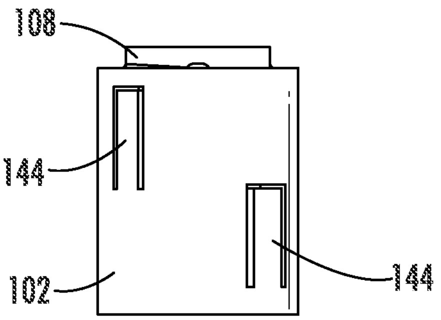
FIG. 11 is a rear view of the first end of the faucet wrench shown in FIG. 1, according to an exemplary embodiment.

In specific embodiments, a plurality of arms 134 protrude from the exterior of first insert 108. Each arm 134 is configured to align with a corresponding channel 136 formed in the interior of body 102. In specific embodiments, channels 136 can also engage two-tab or four-tab plastic basin nuts. As shown in FIGS. 7-8, each arm 134 further includes a protrusion 138 configured to mate with a corresponding cavity 140 within channel 136 when faucet wrench 100 is assembled. Further, a plurality of grooves 142 are formed in insert 108. As shown in FIGS. 7-8, grooves 142 are perpendicular to arms 134. In specific embodiments, body 102 includes cantilever arms 144. Cantilever arms 144 each include a tab 146 configured to engage a respective groove 142 of first insert 108. As shown in FIGS. 9-11, tabs 146 are offset along the length of body 102 such that different tabs 146 may engage a groove 142 of a different component of first insert 108 when first component 130 and second component 132 are stacked relative to each other or spaced longitudinally within body 102.

To assemble the first end of faucet wrench 100 such that the first inner jaw surface 122 is accessible for use, as shown in FIGS. 5 and 11, the second component 132 is positioned within body 102, followed by the first component 130, aligning arms 134 with channels 136. The first component 130 is positioned such that first inner jaw surface 122 is positioned furthest from the interior of body 102 of all the inner jaw surfaces. When first insert 108 is positioned within body 102, tabs 146 snap-fit engage with grooves 142 and protrusions 138 mate with cavities 140, such that first insert 108 is secured within body 102 during use of faucet wrench 100.

To assemble the first end of faucet wrench 100 such that the second inner jaw surface 124 is accessible for use, first component 130 may be removed, rotated 180 degrees and reinserted as described above, such that the second inner jaw surface 124 is positioned furthest from the interior of body 102 of all the inner jaw surfaces. Similarly, to assemble faucet wrench 100 such that either the third inner jaw surface 126 or fourth inner jaw surface 128 is accessible for use, the first component 130 and second component 132 may both be removed, interchanged, and reinserted with the desired inner jaw surface positioned furthest from the interior of body 102, as described above. Alternatively, first insert 108 may comprise only one of the first component 130 and/or second component 132. Even without a second component positioned within body 102, a single component may be securely mated to body 102 in the outermost position by the means described above.

Figure 12:
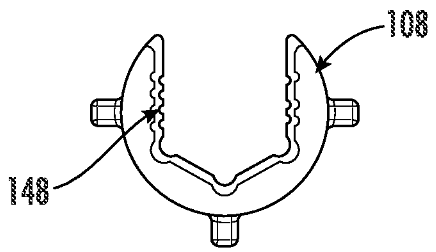
FIG. 12 is a top view of the first insert shown in FIG. 6, according to an exemplary embodiment.

As shown in FIG. 11, when faucet wrench 100 is assembled, a portion of the outermost component of first insert 108 protrudes in part beyond the interior of body 102. Further, referring to FIG. 12, each inner jaw surface includes a variety of gripping elements 148 that increase the grip strength of the first insert 108.

Figure 13:
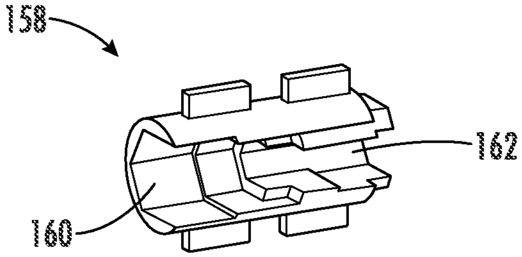
FIG. 13 is a perspective view from the front of a first insert, according to another exemplary embodiment.

Referring to FIG. 13, a first insert, 158 is shown, according to another embodiment. First insert 158 is substantially the same as first insert 108, except for the differences described herein. First insert 158 is a single component that includes a first inner jaw surface 160 and a second inner jaw surface 162. First inner jaw surface 160 and second inner jaw surface 162 are more elongate than the inner jaw surfaces of the dual-component first insert 108 and are, as such, configured to engage a different variety of work pieces.

Figure 14:
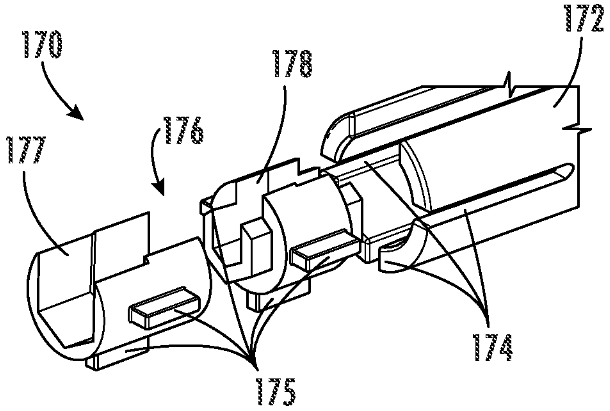
FIG. 14 is an exploded perspective view from the side of the first end of a faucet wrench, according to another exemplary embodiment.

Referring to FIG. 14, a first end of a faucet wrench 170 is shown, according to another embodiment. Faucet wrench 170 is substantially the same as faucet wrench 100 except for the differences described herein. Faucet wrench 170 includes a body 172. Rather than channels, body 172 includes open slots 174 for receiving arms 175 of a first insert 176. First insert 176 includes a first component 177 that mates with a second component 178. In specific embodiments, first insert 176 mates with body 172 by friction fit when first insert 176 is assembled and positioned within body 172. Similar to first insert 108, first insert 176 is cylindrical, similarly allowing for a narrow and sleek profile of body 172.

Figure 15:
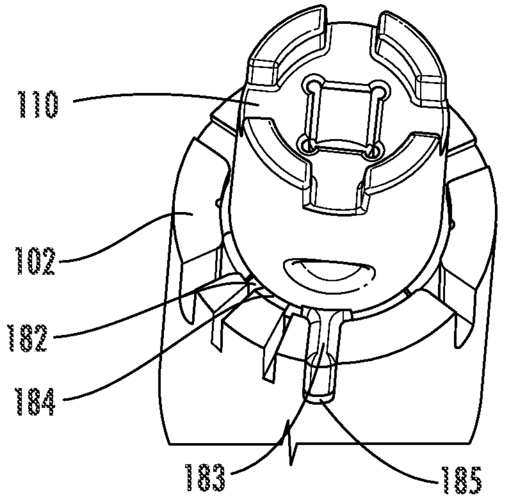
FIG. 15 is a perspective view from the bottom of the second end of the faucet wrench shown in FIG. 1, according to an exemplary embodiment.
Figure 16:
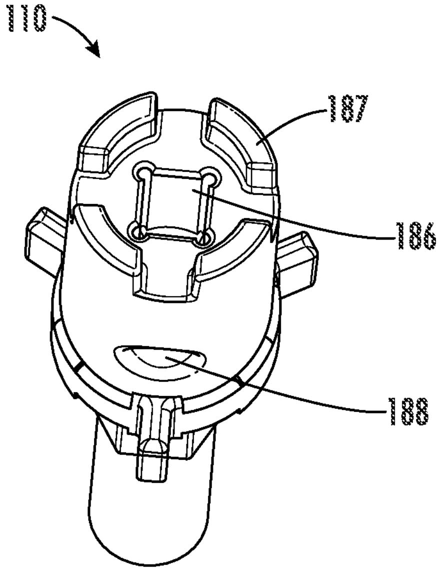
FIG. 16 is a perspective view from the bottom of the second insert shown in FIG. 15, according to an exemplary embodiment.
Figure 17:
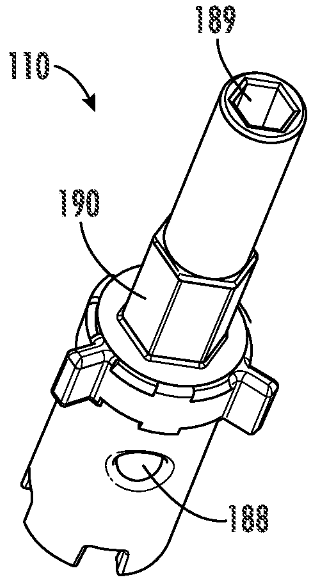
FIG. 17 is a perspective view from the top of the second insert shown in FIG. 15, according to an exemplary embodiment.

Referring to FIGS. 15-17, a second end is shown of faucet wrench 100. As shown in FIG. 15, second insert 110 is coupled to an interior of body 102. Second insert 110 includes a ledge 182. At the second end, body 102 includes a snap-fit tab 184 that engages ledge 182 to secure second insert 110 within body 102. Second insert 110 further includes arms 183 that correspond to slots 185 of body 102 when second insert 110 is coupled to body 102. In specific embodiments, slots 185 can also engage three-tab or six-tab plastic basin nuts.

FIGS. 16-17 show second insert 110 in greater detail. In specific embodiments, second insert 110 includes a first socket 186 with a 7/16" wrench size and slotted surface 187 configured to engage a four-tab basket strainer. Second insert 110 further defines an opening 188 for receiving a screwdriver or other similarly sized leveraging tool for applying additional torque to the workpiece being engaged by faucet wrench 100. As shown in FIGS. 16-17, an opposite end of second insert 110 includes a second socket 189 with a 3/8" drive. Further, second insert 110 includes a 3/4" hex feature 190 to allow an additional wrench to provide further leverage.

Figure 18:
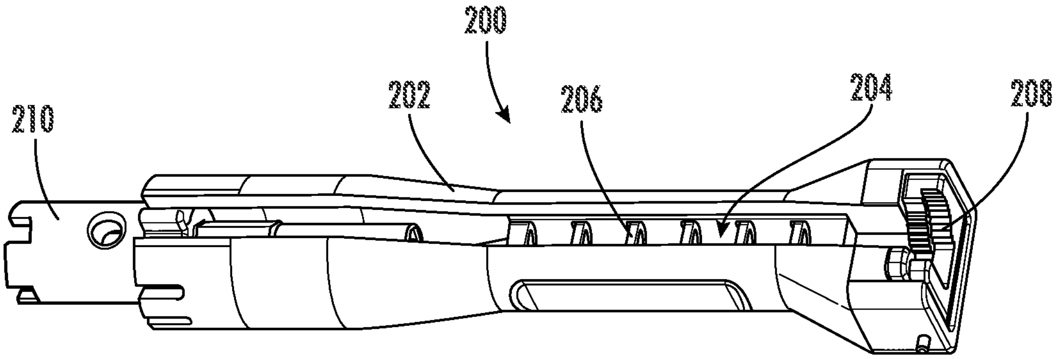
FIG. 18 is a perspective view from the front of a faucet wrench, according to another exemplary embodiment.
Figure 19:
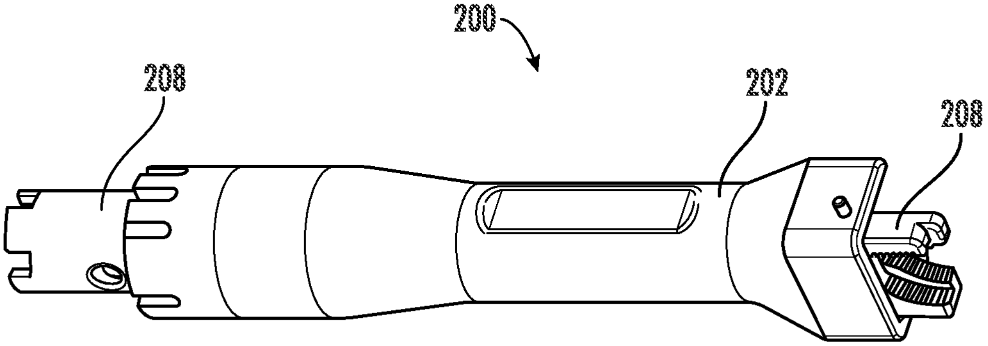
FIG. 19 is a perspective view from the rear of the faucet wrench shown in FIG. 18, according to an exemplary embodiment.
Figure 20:
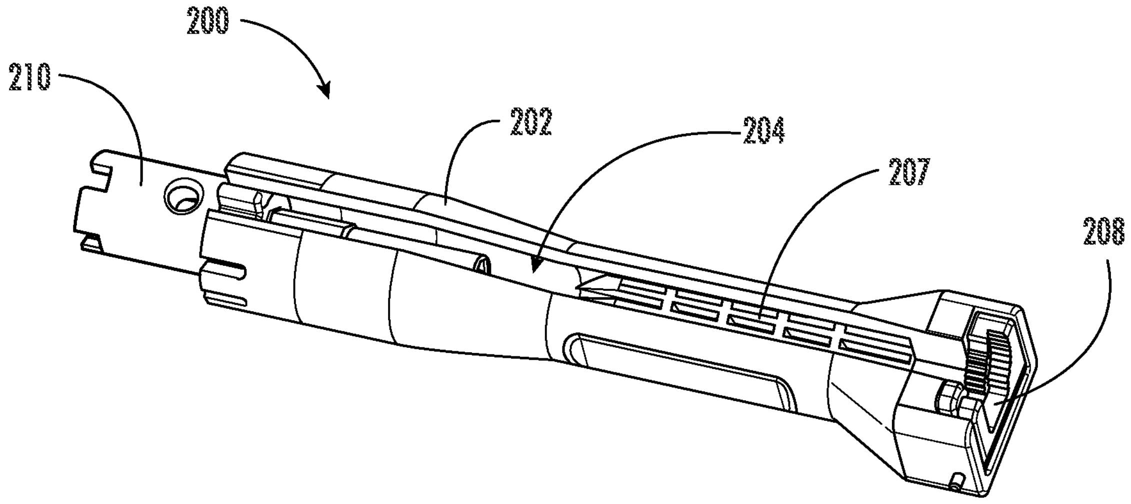
FIG. 20 is a perspective view from the front of the faucet wrench shown in FIG. 18 with an alternate form of interior bridging, according to an exemplary embodiment.

FIGS. 18-20 show a faucet wrench 200 that includes a body 202. Faucet wrench 200 is substantially the same as faucet wrench 100 except for the differences described herein. Body 202 is elongate and defines a slot 204 along its length. As shown in FIGS. 18-20, slot 204 extends the full length of body 102. In specific embodiments, slot 204 is configured to receive a portion of a supply line when faucet wrench 200 is in use. In specific embodiments, body 202 is 10.25" in length and has a maximum diameter of 2.7" or 71 mm and tool bulk diagonal of 2.4" or 60.9 mm. In certain specific embodiments, body 202 has a maximum effective diameter of 3.4" or 86.23 mm, specifically, requires an open space with a diameter of 3.4" or 86.23 mm to effectively rotate about the center point of a workpiece being actuated by the faucet wrench 200.

In specific embodiments, interior bridging 206 is coupled to a mid-section of the body 202. The interior bridging provides additional structural support to the body 202. FIG. 18 shows the interior bridging as horizontal bridging 206, whereas FIG. 20 shows the interior bridging as vertical bridging 207. Orienting the interior bridging vertically allows a greater portion of slot 204 to be utilized for receiving a portion of the supply line, whereas orienting the bridging horizontally provides increased structural support in the lateral direction and provides a platform to support and store nuts removed while working on a given project.

Faucet wrench 200 further includes a first insert 208 and a second insert 210 positioned at opposing longitudinal ends of body 202. First insert 208 and second insert 210 are each configured to engage workpieces of various shapes and sizes. The second end of body 202 and second insert 210 coupled thereto are substantially the same as the corresponding second end of body 102 and second insert 110.

FIGS. 21-25 show the first end of body 202 and first insert 208 in greater detail. In specific embodiments, first insert 208 includes a wedge 212 and a pin 214. In specific embodiments, pin 214 protrudes beyond the exterior of body 202 and is readily releasable. The wedge 212 forms an opening 213 that receives the pin 214. When assembled, the wedge 212 is pivotable about the pin 214 from a first position shown in FIGS. 18 and 21 to a second position, shown in FIG. 19. In the second position, wedge 212 is flipped outward, specifically, pivoted ninety degrees from the position shown in FIG. 21. In specific embodiments, when wedge 212 is in the first position, the faucet wrench 200 can be operated in a vertical orientation to actuate an engaged workpiece. When wedge 212 is in the second position, the faucet wrench can be operated in a horizontal orientation to actuate an engaged workpiece. As such, the faucet wrench 200 can apply a greater amount of torque to the workpiece being actuated when the space around the workpiece is sufficient to permit the horizontal orientation, and can also be used to access workpieces in narrower spaces when operated in vertical orientation.

Figure 22:
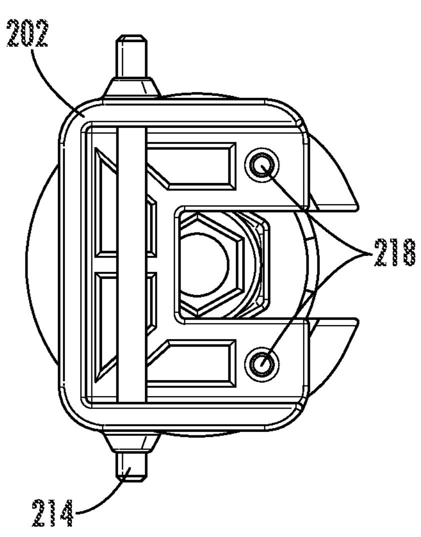
FIG. 22 is a top view of the faucet wrench shown in FIG. 20 with a portion of the first insert removed, according to an exemplary embodiment.
Figure 23:
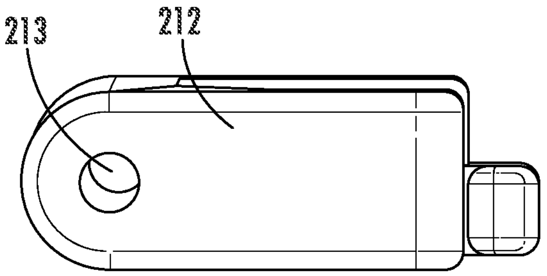
FIG. 23 is a side view of the wedge shown in FIG. 21, according to an exemplary embodiment.

As shown in FIG. 22, the first end of body 202 includes a pair of magnets 218 that magnetically attract wedge 212 and serve to maintain wedge 212 in the first position when faucet wrench 200 is in use in the vertical orientation or when faucet wrench 200 is stored within a toolbox or tool bag. During storage and transport, it can be beneficial for wedge 212 to be substantially nested within body 202, such as in the first position. When wedge 212 is flipped out of body 202, there is a greater risk of wedge 212 being broken or inadvertently detached from body 202 when faucet wrench 200 is jostled against other tools. In specific embodiments, magnets 218 are ⅛" magnets.

Figure 21:
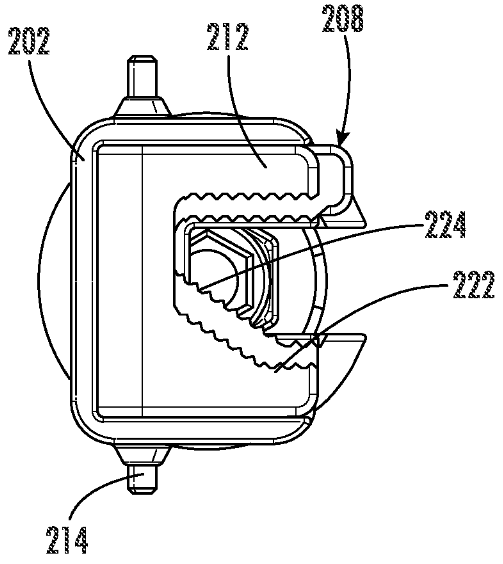
FIG. 21 is a top view of the faucet wrench shown in FIG. 20, according to an exemplary embodiment.
Figure 24:
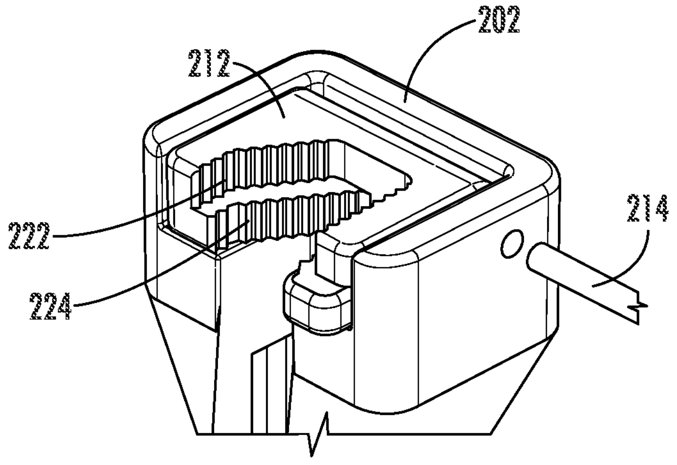
FIG. 24 is a perspective view from the top of the first end of the faucet wrench shown in FIG. 20 with the release pin withdrawn, according to an exemplary embodiment.
Figure 25:
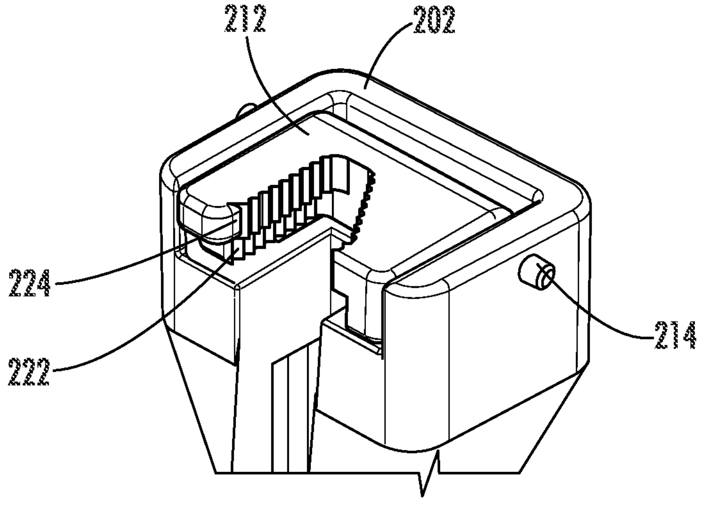
FIG. 25 is a perspective view from the top of the first end shown in FIG. 24 with the wedge in an alternate orientation from the orientation shown in FIG. 24, according to an exemplary embodiment.

In specific embodiments, wedge 212 includes multiple stepped inner jaw surfaces, each for engaging a wide variety of differently sized workpieces, specifically differently sized nuts. More specifically, wedge 212 includes a first inner jaw surface 222 that provides a first wrench size, and a second inner jaw surface 224 that provides a second wrench size. In specific embodiments, the first wrench size is 7/16" and the second wrench size is 15/16." When wedge 212 is in the first position, the outermost inner jaw surface is the surface used to actuate a selected workpiece. For example, as shown in FIG. 21, first inner jaw surface 222 is the outermost inner jaw surface, and thus the inner jaw surface that is accessible for workpiece engagement. To access second inner jaw surface 224, pin 214 is released from opening 213, as shown in FIG. 24. Wedge 212 is then rotated 180 degrees such that second inner jaw surface 224 is now the outermost inner jaw surface, as shown in FIG. 25, and pin 214 is reinserted.

Figure 26:
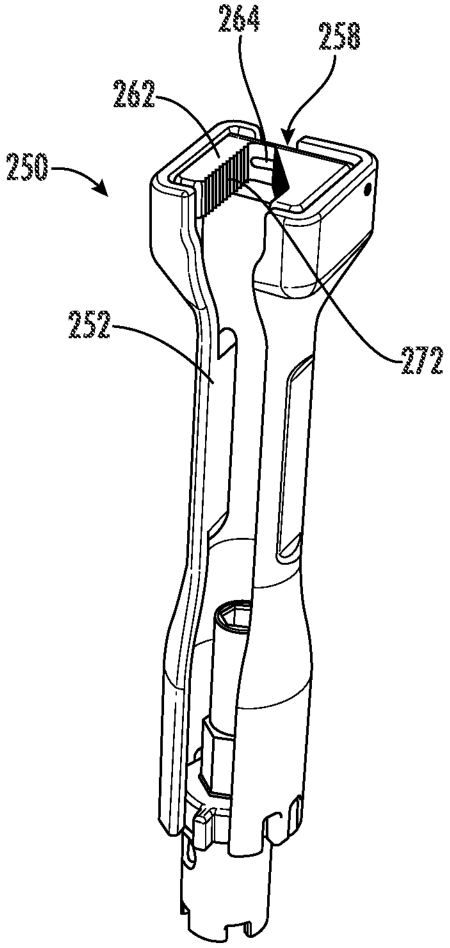
FIG. 26 is a perspective view from the front of a faucet wrench with the wedge in a first position, according to another exemplary embodiment.
Figure 27:
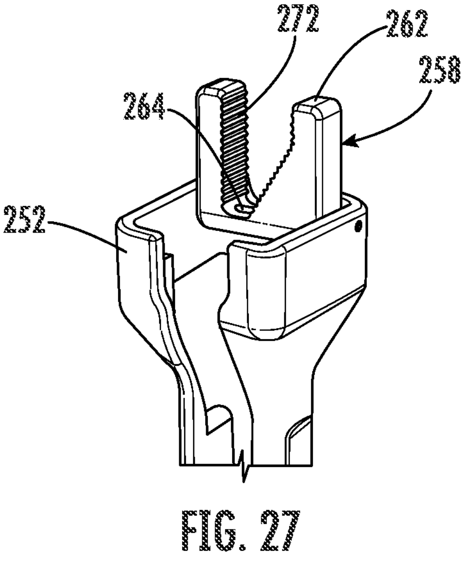
FIG. 27 is a perspective view from the top of the first end of the faucet wrench shown in FIG. 26 with the wedge in a second position, according to an exemplary embodiment.

Referring to FIGS. 26-27, a faucet wrench 250 is shown. Faucet wrench 250 is substantially the same as faucet wrench 200 except for the differences described herein. Faucet wrench 250 includes a first insert 258. First insert 258 has a wedge 262 that pivots about a pin 264 from a first position, shown in FIG. 26, to a second position, shown in FIG. 27.

As shown in FIGS. 26-27, wedge 262 contains only a single inner jaw surface 272. In specific embodiments, first insert 258 is not readily detachable from body 252. As such, in specific embodiments, pin 264 is contained within body 252 and does not function as a releasable pin. This helps to prevent first insert 258 and components thereof from being lost. In certain specific embodiments, inner jaw surface 272 is configured to engage similar work pieces to either first inner jaw surface 222 or second inner jaw surface 224, described above. In other specific embodiments, inner jaw surface 224 is configured to engage workpieces of a different variety of sizes and/or shapes.

Figure 28:
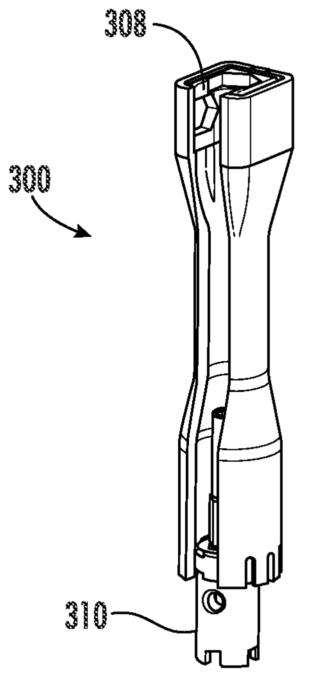
FIG. 28 is a perspective view from the front of a faucet wrench, according to another exemplary embodiment.
Figure 29:
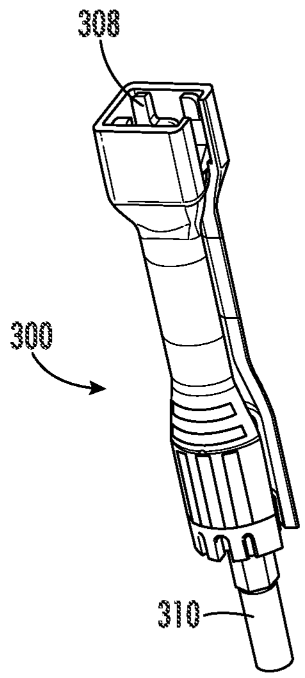
FIG. 29 is a perspective view from the front of the faucet wrench shown in FIG. 28 with the first and second inserts positioned in alternate orientations, according to another exemplary embodiment.

Referring to FIGS. 28-29 a faucet wrench 300 is shown. Faucet wrench 300 is substantially the same as faucet wrench 100 except for the differences described herein. Faucet wrench 300 includes a first insert 308 and a second insert 310 positioned at opposing longitudinal ends of body 302. First insert 308 and second insert 310 are each configured to engage workpieces of various shapes and sizes. The second end of body 302 and second insert 310 coupled thereto are substantially the same as the corresponding second end of body 102 and second insert 110 described above.

Figure 30:
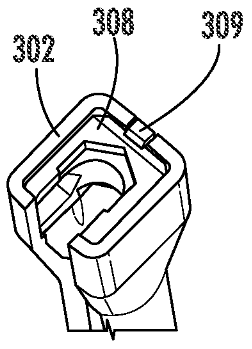
FIG. 30 is a perspective view from the top of the first end of the faucet wrench shown in FIG. 28, according to an exemplary embodiment.
Figure 31:
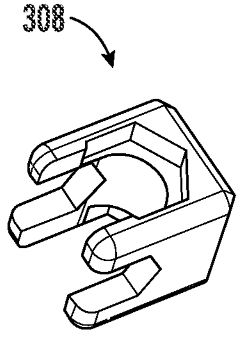
FIG. 31 is a perspective view from the front of the first insert shown in FIG. 30, according to an exemplary embodiment.
Figure 32:
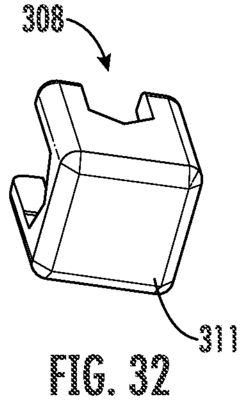
FIG. 32 is a perspective view from the rear of the first insert shown in FIG. 30, according to an exemplary embodiment.

First insert 308 is rectangular in shape. In specific embodiments, first insert 308 can be removed from, reoriented, and replaced within body 302 to provide access to different work surfaces. Two such orientations of first insert 308 are shown in FIG. 28 and FIG. 29, respectively. FIG. 30 shows a first end of faucet wrench 300, with first insert 308 positioned within body 302. First insert 308 is coupled to body 302 by a snap-fit connection between a tab 309 protruding from body 202 and the exterior surface of first insert 308. FIGS. 31-32 show the first insert 308 in greater detail. As shown in FIG. 32, a base surface 311 of first insert 308 includes indicators that indicate the size of the corresponding protruding work surface.

Figure 33:
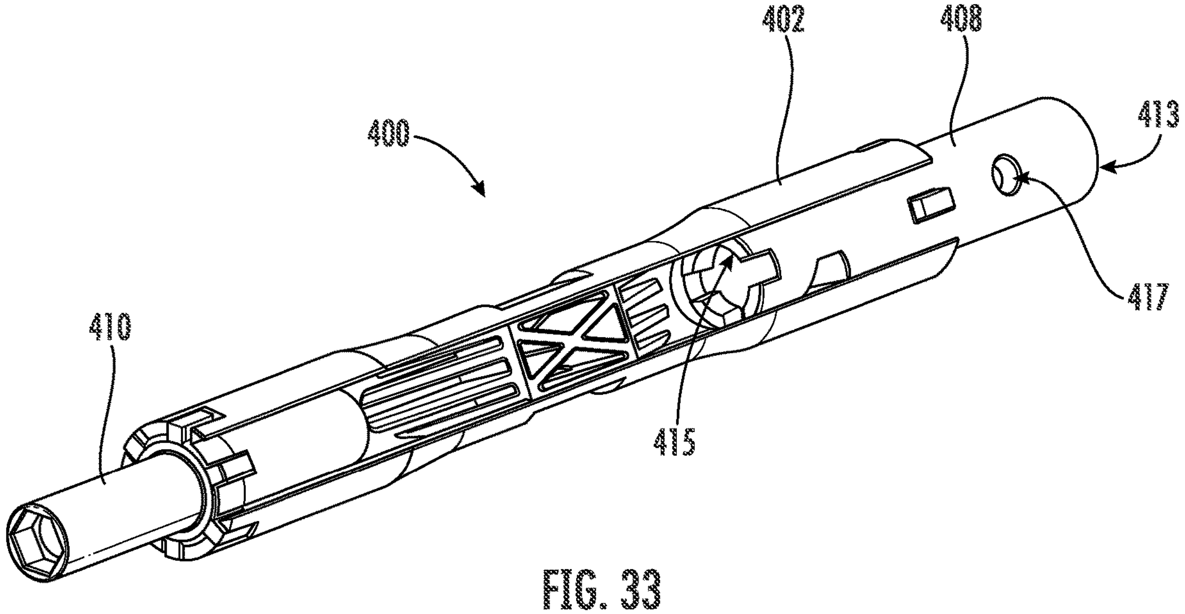
FIG. 33 is a perspective view from the front of a faucet wrench, according to another exemplary embodiment.

Referring to FIG. 33, a faucet wrench 400 is shown. Faucet wrench 400 is substantially the same as faucet wrench 100 except for the differences described herein. Faucet wrench 400 includes a first insert 408 and a second insert 410 positioned at opposing longitudinal ends of body 402. First insert 408 and second insert 410 are each configured to engage workpieces of various shapes and sizes. The second end of body 402 and second insert 410 coupled thereto are substantially the same as the corresponding second end of body 102 and second insert 110 described above.

The first insert 408 has a narrow cylindrical profile, providing for a slim and narrow profile of body 402. First insert 408 is reversible to offer accessibility to two different work surfaces at opposing longitudinal ends, for example, a ⅝" hex nut socket and ⅝" hex nut wrench at a first end 413 and an attachment for engaging a 4-tab basket strainer at a second end 415. First insert 408 further defines a hole 417 for receiving a screwdriver or similarly shaped tool to provide additional leverage to faucet wrench 400.

Figure 34:
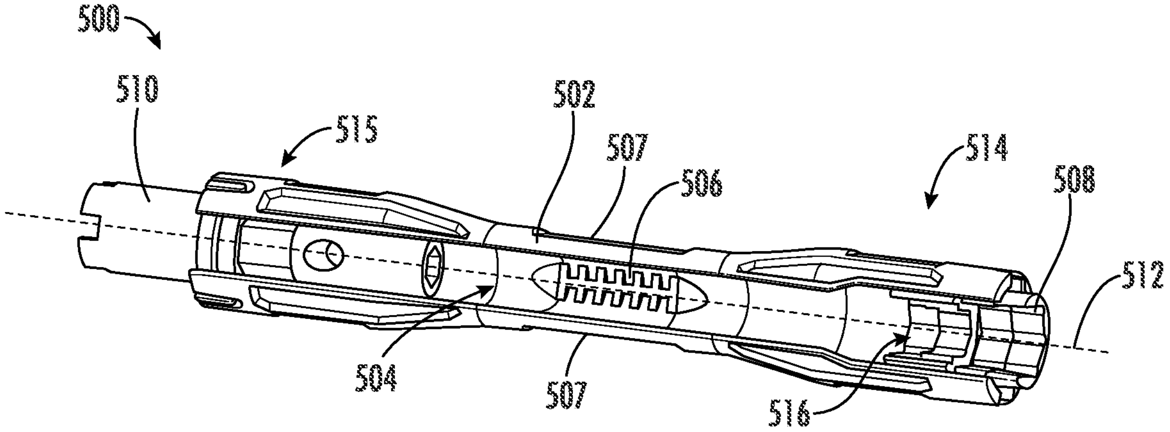
FIG. 34 is a perspective view from the front of a faucet wrench, according to another exemplary embodiment.
Figure 35:
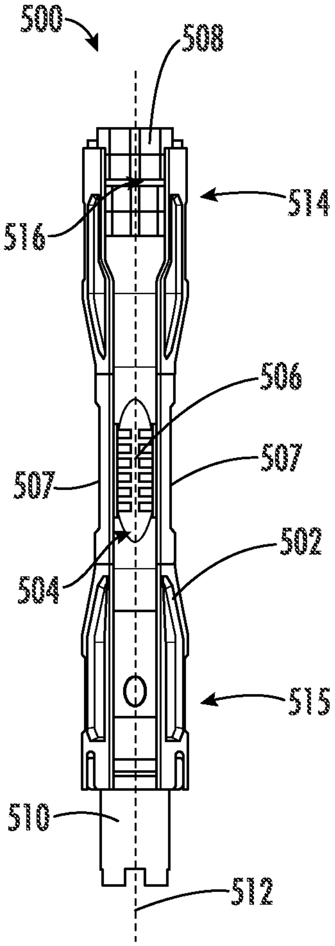
FIG. 35 is a front view of the faucet wrench shown in FIG. 34, according to an exemplary embodiment.
Figure 36:
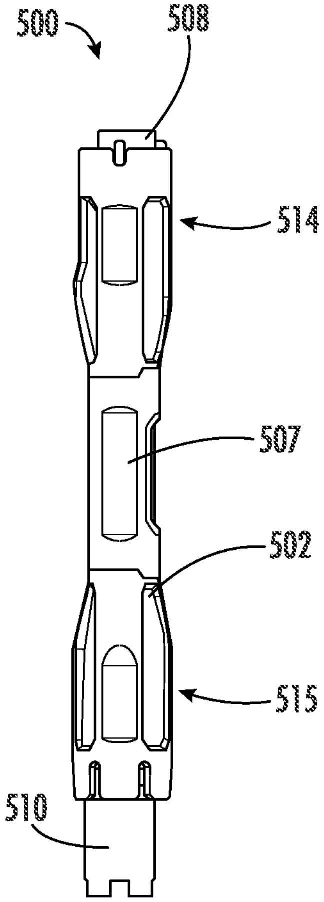
FIG. 36 is a side view of the faucet wrench shown in FIG. 34, according to an exemplary embodiment.
Figure 37:
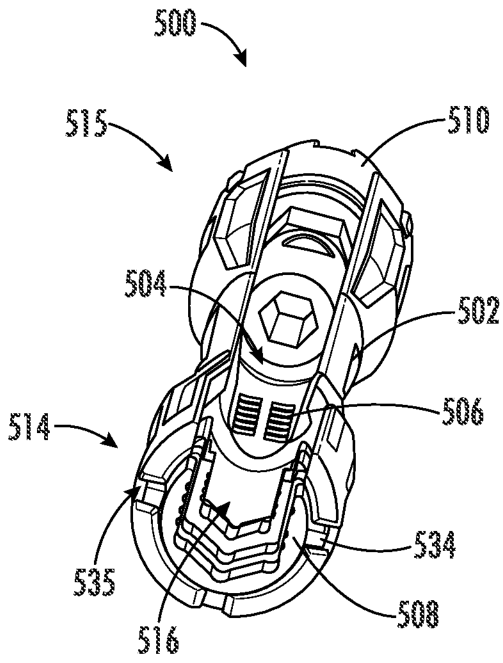
FIG. 37 is a top perspective view of the faucet wrench in FIG. 34, according to an exemplary embodiment.
Figure 38:
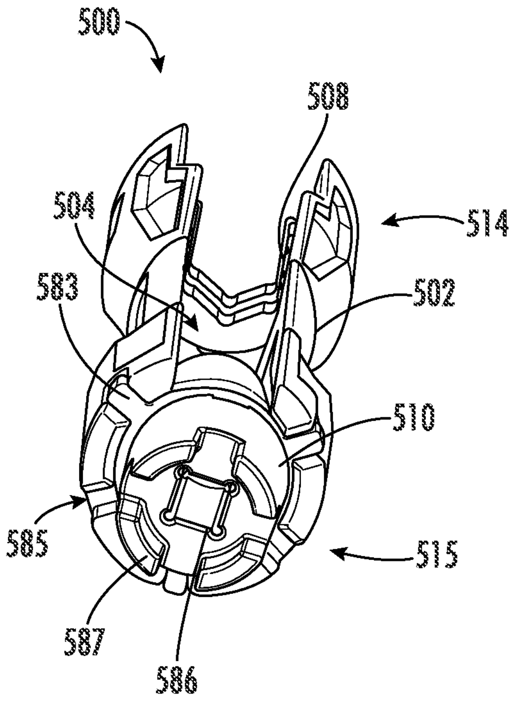
FIG. 38 is a bottom perspective view of the faucet wrench in FIG. 34, according to an exemplary embodiment.

FIGS. 34-43 show a faucet wrench 500 that includes a body 502. Faucet wrench 500 is substantially the same as faucet wrench 100 except for the differences described herein. Body 502 is elongate and defines a slot or continuous passageway 504 along its length. As shown in FIGS. 34-35, slot 504 extends the full length of body 502. Body 502 includes a first end 514 and a second end 515 that opposes first end 514. A middle portion 554 (see e.g., FIG. 40) is positioned between and connects the first end 514 and the second end 515 of body 502.

Slot 504 extends between first end 514 and second end 515 along a longitudinal axis 512 of wrench 500. An exterior surface of body 502 includes a pair of opposing, generally planar or flat surfaces 507 positioned on opposite sides of interior bridging 506. The opposing generally planar surfaces 507 are configured to be engaged by a wrench such as a standard wrench to provide torque to rotate a workpiece engaged by faucet wrench 500.

A first insert 508 is removably couplable to first end 514 of body 502. A second insert 510 is removably couplable at opposing longitudinal end or second end 515 of body 502. First insert 508 is generally cylindrical and includes various features to facilitate insert retention, as will be described in greater detail below. The generally cylindrical shape of first insert 508 allows body 502 to likewise maintain a generally cylindrical shape, which slims the profile of body 502 and allows body 502 to axially rotate more efficiently in narrow or tight spaces. In other words, first insert 508 includes a curved outer surface 540 (see e.g., FIG. 42) that faces the body 502 when the first insert 508 is coupled to the body 502. Second insert 510 includes a first end configured to engage a workpiece having a first shape and a second end opposing the first end and configured to engage a workpiece having a second shape. In a specific embodiment the first shape is different than the second shape. In such an embodiment, a first socket 586 has a square shape and a second socket 589 has a hex shape. In other embodiments, the first and second socket may have a different socket shape.

In specific embodiments, slot 504 is configured to receive a portion of a supply line when faucet wrench 500 is in use. Interior bridging 506 is coupled to the middle portion 554 of the body 502. Bridging 506 provides additional structural support to the body 502. As previously discussed, when the interior bridging is oriented vertically (i.e., along longitudinal axis 512) a greater portion of slot 504 can be utilized for receiving a portion of the supply line, whereas orienting the bridging horizontally (i.e., perpendicular to longitudinal axis 512) provides increased structural support in the lateral direction and provides a platform to support and store nuts removed while working on a given project. In a specific embodiment, interior bridging 506 includes a vertical portion extending along the longitudinal axis 512 and a horizontal portion extending in a generally perpendicular (i.e., 90 degrees plus or minus 10 degrees) orientation to the vertical portion. In a specific embodiment, the bridging includes a dimension or height (extending inward from inner surface of body 502) such that middle portion 554 of body 502 receives a portion of a supply line when the wrench 500 is in use.

In various specific embodiments, body 502 has the same dimensions as body 102 (i.e., length, maximum diameter, tool bulk diagonal, maximum effective diameter, open space diameter etc.). In various specific embodiments, body 502 has different dimensions than body 102 (i.e., length, maximum diameter, tool bulk diagonal, maximum effective diameter, open space diameter etc).

Figure 39:
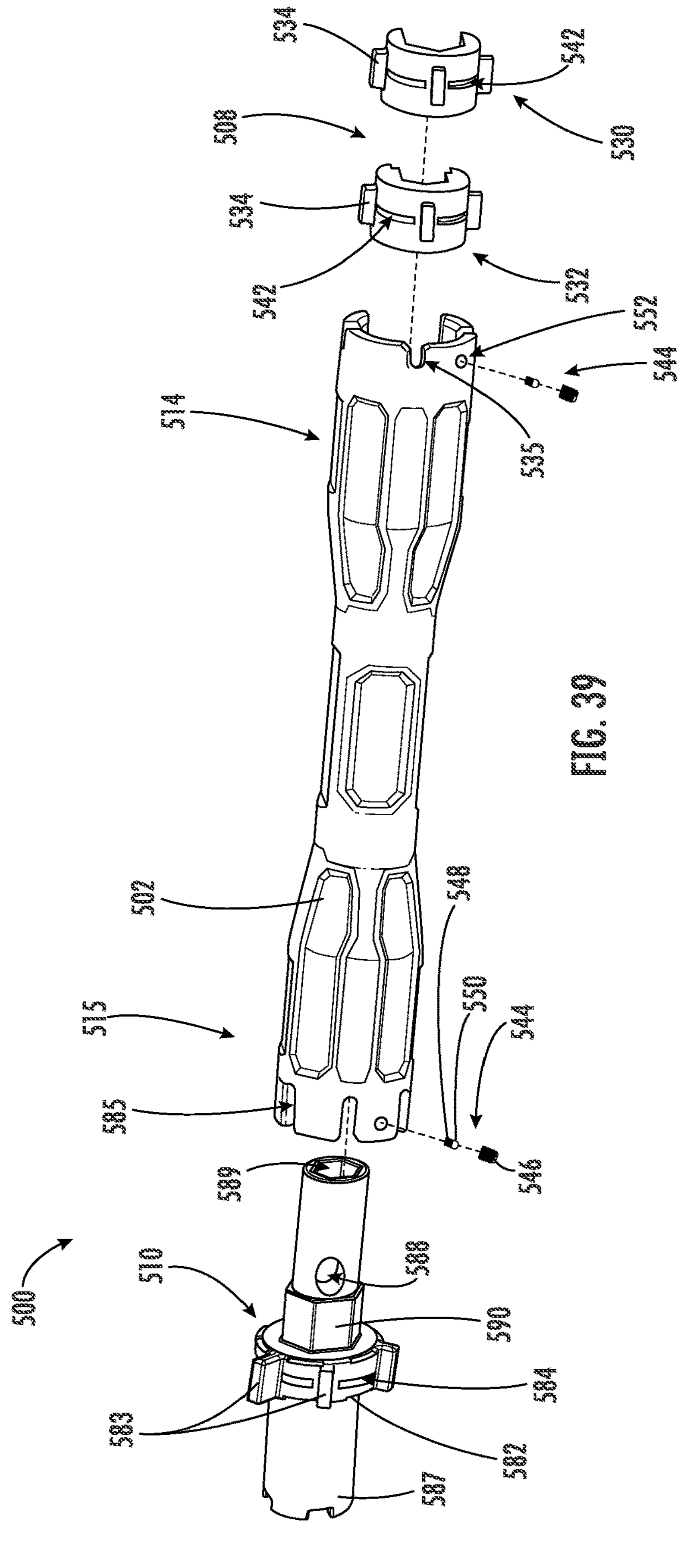
FIG. 39 is an exploded view of the faucet wrench in FIG. 34, according to an exemplary embodiment.

Referring to FIG. 39, an exploded view of faucet wrench 500 is shown, according to an exemplary embodiment. Body 502 includes a through bore 552 positioned at first end 514 and second end 515. Through bore 552 is sized and/or configured to receive a portion of a locking mechanism 544. Locking mechanism 544 includes a fastener 546, a biasing element 548 and a ball 550. In a specific embodiment, fastener 546 is a screw with a socket head. In such an embodiment, fastener 546 is a screw with a hex socket head. When locking mechanism 544 is assembled, biasing element 548, shown as a spring is positioned within fastener 546 and ball 550 is positioned at least partially within fastener 546 and engaged with biasing element 548. When first insert 508 and/or second insert 510 are coupled to first end 514 and second end 515 respectively, fastener 546 can be tightened such that ball 550 is pushed and/or moved into engagement with a portion of first insert 508 and/or second insert 510 to further secure first insert 508 and/or second insert 510 to body 502.

Figure 40:
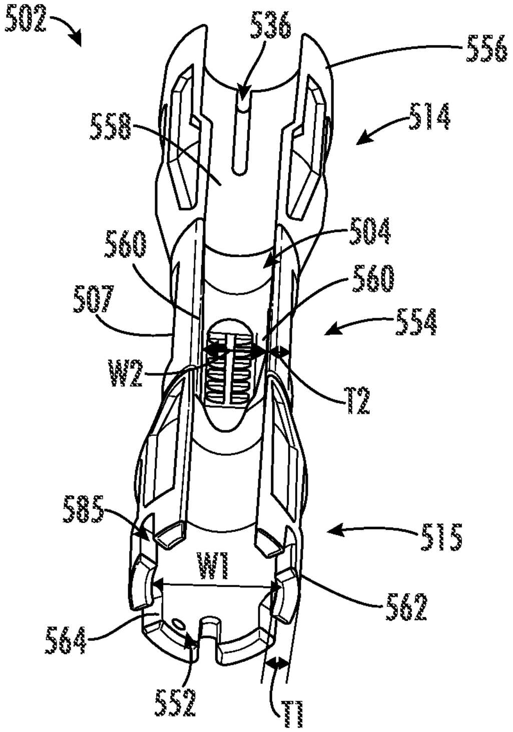
FIG. 40 is a perspective view of a body of the faucet wrench of FIG. 34, according to an exemplary embodiment.
Figure 41:
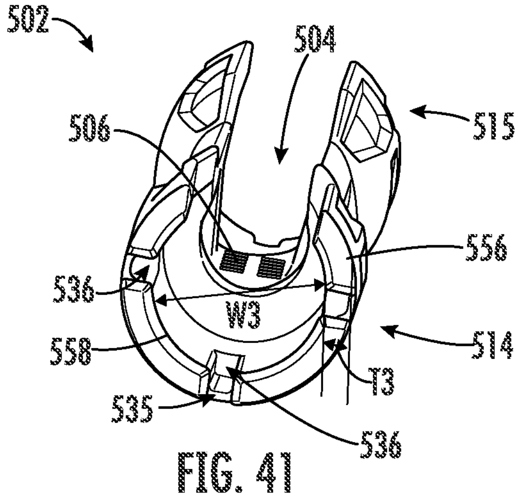
FIG. 41 is a perspective view of a body of the faucet wrench of FIG. 34, according to an exemplary embodiment.

Referring to FIGS. 40-41, perspective views of the interior of wrench 500 are shown, according to an exemplary embodiment. First end 514 of body 502 includes notches, shown as longitudinal notches 535 that extend toward second end 515 of body 502. First insert 508 includes arms, shown as aligning arms 534 (see e.g., FIG. 42) that correspond to and engage notches 535 of body 502 when first insert 508 is coupled to body 502. Aligning arms 534 extend outward from outer surface 540 of first insert 508 that faces an interior surface of body 502 when the first insert 508 is coupled to body 502. In specific embodiments, notches 535 can also engage three-tab plastic basin nuts. In other embodiments, different numbers (i.e., 5, 6, etc.) of notches 535 can be positioned at first end 514 to engage plastic basin nuts.

An inner surface 558 of body 502 at first end 514 further includes a channel 536. Channel 536 extends along the longitudinal axis 512 and connects to longitudinal notch 535. In other words, channel 536 extend in a generally parallel (i.e., plus or minus 10 degrees) direction to longitudinal axis 512. In a specific embodiment, each longitudinal notch 535 is connected to a channel 536. When first insert 508 is coupled to body 502, a portion of first insert 508 is received within channel 536 to secure first insert 508 to body 502. In a specific embodiment, when first insert 508 is coupled to body 502, aligning arms 534 engage with channel 536 of body 502 to secure first insert 508 within the body 502.

Specifically, when the first insert 508 is coupled to body 502 at least a portion of first component 530 and second component 532 (see e.g., FIGS. 42-43) of first insert is received within the channel 536 to secure first component 530 and second component 532 to body 502. A dimension, shown as a diameter or width W3 at first end 514 is defined between opposing sides of inner surface 558. At first end 514, body 502 includes a wall thickness, T3. T3 is defined between an outer surface 556 at first end 514 and inner surface 558.

Second end 515 of body 502 includes notches, shown as longitudinal notches 585 that extend toward first end 514. Second insert 510 includes arms 583 (see e.g., FIG. 39) that correspond to and engage notches 585 of body 502 when second insert 510 is coupled to body 502. In specific embodiments, notches 585 can also engage five-tab plastic basin nuts. In other embodiments, different numbers (i.e., 3, 6, etc.) of notches 585 can be positioned at second end 515 to engage plastic basin nuts.

Body 502 further includes an inner surface 564 at second end 515. A dimension, shown as a diameter or width W1 is defined between opposing sides of inner surface 564. At second end 515, body 502 includes a wall thickness, T1. T1 is defined between an outer surface 562 at second end 515 and inner surface 564.

Middle portion 554 of body 502 includes an inner surface 560. A dimension, shown as a diameter or width W2 is defined between opposing sides of inner surface 560. At middle portion 554, body 502 includes a wall thickness, T2. T2 is defined between the outer planar surface 507 at middle portion 554 and inner surface 560.

Figure 42:
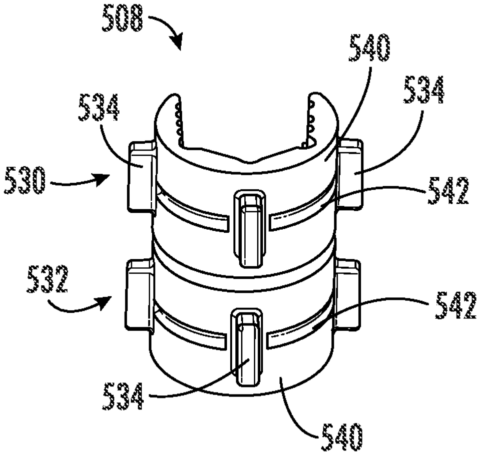
FIG. 42 is a rear perspective view of a first insert of the faucet wrench of FIG. 34, according to an exemplary embodiment.
Figure 43:
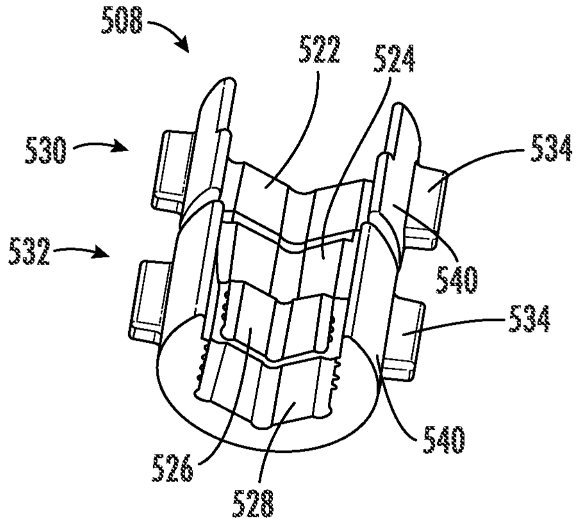
FIG. 43 is a front perspective view of the first insert shown in FIG. 42, according to an exemplary embodiment.

Referring to FIGS. 42-43, details of first insert 508 are shown, according to an exemplary embodiment. First insert 508 includes multiple stepped inner jaw surfaces, each for engaging a wide variety of differently sized workpieces, specifically differently sized nuts. First insert 508 includes two interchangeable components, shown as first component 530 and second component 532. In other words, first component 530 can be the outermost (i.e., farther away from second end 515 of body) portion of first insert 508 and second component 532 can be moved such that second component 532 is the outermost portion of first insert 508.

First insert 508 includes a first inner jaw surface 522 that provides a first wrench size, a second inner jaw surface 524 that provides a second wrench size, a third inner jaw surface 526 that provides a third wrench size, and a fourth inner jaw surface 528 that provides a fourth wrench size. In other words, first inner jaw surface 522 has a first dimension or jaw opening size to engage a workpiece having a first size, second inner jaw surface 524 has a second dimension to engage a workpiece having a second size, third inner jaw surface 526 has a third dimension to engage a workpiece having a third size and fourth inner jaw surface 528 has a fourth dimension to engage a workpiece having a fourth size. In a specific embodiment, the first wrench size is $^{15}/_{16}$," the second wrench size is $^{7}/_{8}$," the third wrench size is $^{5}/_{8}$," and the fourth wrench size is $^{3}/_{4}$." In specific embodiments, each of the first component 530 and second component 532 include exterior indicators or markings that indicate the size of the corresponding surface.

When wrench 500 is assembled such that second component 532 is positioned between first component 530 and second end 515 of body 502 and first component 530 is in a first orientation, the first inner jaw surface 522 protrudes beyond the first end 514 of body 502 such that the first inner jaw surface is engageable with a workpiece having a first size. When a user reverses first component 530 into a second orientation (i.e., flips first component 530's position), second inner jaw surface 524 protrudes beyond first end 514 of body 502 such that second inner jaw surface 524 is engageable with a workpiece having a second size.

When use of the third or fourth sized wrench is desired, a user can interchange second component 532 with first component 530. In other words, second component 532 can become the outermost portion of first insert 508. When the first component 530 is interchanged with second component 532, first component 530 is positioned between the second component 532 and second end 515 of body 502. In the interchanged position, either the third inner jaw surface 526 or fourth inner jaw surface 528 protrudes beyond the first end 514 of body 502 such that the third inner jaw surface 526 or fourth inner jaw surface 528 is engageable with a workpiece having a third size or the workpiece having the fourth size.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed:

1. A faucet wrench comprising:

an elongate body comprising:
- a first end;
- a second end opposing the first end; and
- a slot extending between the first end and the second end along a longitudinal axis; and a first insert, the first insert removably couplable to the elongate body and positioned at the first end of the elongate body, the first insert comprising:
- a first component, the first component comprising:
  - a first end surface;
  - a second end surface opposing the first end surface;
  - a first inner jaw surface that provides a first wrench size; and
  - a second inner jaw surface that provides a second wrench size; and
- a second component stacked relative to the first component along the longitudinal axis, the second component comprising:
  - a third end surface, the third end surface facing the second end surface of the first component;
  - a third inner jaw surface that provides a third wrench size; and
  - a fourth inner jaw surface that provides a fourth wrench size.

2. The faucet wrench of claim 1, wherein first insert has a generally cylindrical shape.

3. The faucet wrench of claim 1, wherein the first component is interchangeable with the second component.

4. The faucet wrench of claim 1, wherein the first end of the elongate body includes a longitudinal notch extending toward the second end of the elongate body.

5. The faucet wrench of claim 4, wherein a channel is defined in an inner surface of the elongate body and wherein the channel extends along the longitudinal axis and connects to the longitudinal notch.

6. The faucet wrench of claim 5, wherein, when the first insert is coupled to the elongate body, at least a portion of the first component and the second component is received within the channel to secure the first component and the second component to the elongate body.

7. The faucet wrench of claim 1, further comprising a second insert removably couplable to the elongate body and positioned at the second end of the elongate body.

8. The faucet wrench of claim 7, wherein the second insert comprises:
- a first end configured to engage a workpiece having a first shape; and
- a second end opposing the first end and configured to engage a workpiece having a second shape;
- wherein the second shape is different than the first shape.

9. The faucet wrench of claim 1, wherein the second end surface of the first component and the third end surface of the second component each face in a direction in which the longitudinal axis extends.

10. The faucet wrench of claim 1, wherein the first end surface is the outermost surface of the first insert.

11. The faucet wrench of claim 1, wherein the first end surface extends beyond the first end of the elongate body, and wherein the third end surface is positioned within the elongate body.

12. A faucet wrench comprising:
- an elongate body comprising:
  - a first end;
  - a second end opposing the first end; and
  - a slot extending between the first end and the second end along a longitudinal axis; and
- a first insert, the first insert removably couplable along an interior surface of the elongate body and positioned at the first end of the elongate body, the first insert comprising:
  - a first component, the first component comprising:
    - a first longitudinally facing end surface;
    - a first inner jaw surface that provides a first wrench size; and
    - a second inner jaw surface that provides a second wrench size;
  - a second component stacked relative to the first component along the longitudinal axis, the second component comprising:
    - a second longitudinally facing end surface, the second longitudinally facing end surface facing toward the first longitudinally facing end surface of the first component;
    - a third inner jaw surface that provides a third wrench size; and
    - a fourth inner jaw surface that provides a fourth wrench size;
- wherein a channel is defined in the interior surface of the elongate body and extends in a generally parallel direction to the longitudinal axis; and
- wherein, when the first insert is coupled to the elongate body, a portion of the first insert is received within the channel to secure the first insert to the elongate body.

13. The faucet wrench of claim 12, wherein the first end of the elongate body includes a notch extending toward the second end of the elongate body and wherein the channel connects to the notch.

14. The faucet wrench of claim 12, wherein the first insert includes an aligning arm extending outward from an outer surface of the first insert that faces the interior surface of the elongate body when the first insert is coupled to the elongate body.

15. The faucet wrench of claim 14, wherein, when the first insert is coupled to the elongate body, the aligning arm engages with the channel of the elongate body to secure the first insert within the elongate body.

16. The faucet wrench of claim 12, wherein the first longitudinally facing end surface is the lowermost surface of the first component, and wherein the second longitudinally facing end surface is the uppermost surface of the second component.

* * * * *